(12) United States Patent
Carr et al.

(10) Patent No.: US 12,739,118 B2
(45) Date of Patent: Sep. 15, 2026

(54) MEMORY MANAGEMENT WITH IMPLICIT IDENTIFICATION OF CRYPTOGRAPHIC KEYS USING ERROR CORRECTION DATA

(71) Applicant: Rambus Inc., San Jose, CA (US)

(72) Inventors: Larrie Carr, Kelowna (CA); Sanjay Goyal, Roseville, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/861,133

(22) PCT Filed: Jun. 2, 2023

(86) PCT No.: PCT/US2023/024375
§ 371 (c)(1),
(2) Date: Oct. 28, 2024

(87) PCT Pub. No.: WO2023/235613
PCT Pub. Date: Dec. 7, 2023

(65) Prior Publication Data
US 2025/0286715 A1 Sep. 11, 2025

Related U.S. Application Data

(60) Provisional application No. 63/470,295, filed on Jun. 1, 2023, provisional application No. 63/348,841, filed on Jun. 3, 2022.

(51) Int. Cl.

| | |
|---|---|
| ***H04L 1/00*** | (2006.01) |
| ***G06F 11/08*** | (2006.01) |
| ***H04L 9/08*** | (2006.01) |
| ***H04L 9/14*** | (2006.01) |
| ***H04L 9/30*** | (2006.01) |

(52) U.S. Cl.
CPC ............ *H04L 9/304* (2013.01); *H04L 9/0819* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 5,917,837 | A | 6/1999 | Stein |
| 6,108,811 | A | 8/2000 | Nakamura et al. |
| 8,499,221 | B2 | 7/2013 | Franceschini et al. |

(Continued)

OTHER PUBLICATIONS

Notification of Transmittal of the International Search Report and the Written Opinion of the International Searching Authority, or the Declaration with Mail Date Oct. 31, 2023 re: Int'l Appln. No. PCT/US2023/024375. 20 pages.

(Continued)

*Primary Examiner* — Christopher B Robinson
(74) *Attorney, Agent, or Firm* — Lowenstein Sandler LLP

(57) ABSTRACT

Disclosed systems and techniques involve storage of encrypted data in memory pages that may include units stored with different cryptographic keys. Data may be stored with error correction data that implicitly encodes an identification of a key (key selector) without additional memory being allocated to explicit storage of the key selector. During data retrieval, the key selector is recovered from error correction data by processing multiple instances of extended data in which the data is combined with various possible key selectors.

18 Claims, 7 Drawing Sheets

(56) References Cited

U.S. PATENT DOCUMENTS

| | | | | |
|---|---|---|---|---|
| 8,694,862 | B2 | 4/2014 | Sazeides et al. | |
| 9,559,726 | B2 | 1/2017 | Greenspan et al. | |
| 10,333,698 | B2 * | 6/2019 | Shamee | H03M 13/151 |
| 10,346,318 | B2 * | 7/2019 | Deutsch | H04L 9/0631 |
| 2004/0250096 | A1 | 12/2004 | Cheung et al. | |
| 2006/0090114 | A1 * | 4/2006 | Duffy | G06V 40/18<br>714/746 |
| 2012/0254688 | A1 | 10/2012 | Resch | |
| 2014/0101515 | A1 | 4/2014 | Akiyama et al. | |
| 2015/0288663 | A1 * | 10/2015 | Watanabe | H04L 63/166<br>380/28 |
| 2016/0018996 | A1 * | 1/2016 | Doumen | G06F 3/0673<br>714/766 |
| 2016/0056953 | A1 * | 2/2016 | Komano | H04L 9/3278<br>713/189 |
| 2018/0294921 | A1 | 10/2018 | Miyata et al. | |
| 2019/0095350 | A1 | 3/2019 | Durham et al. | |
| 2021/0119780 | A1 * | 4/2021 | Hassan | H04L 9/088 |
| 2022/0200797 | A1 * | 6/2022 | Bezzateev | H04L 9/0822 |

OTHER PUBLICATIONS

Sazeides, Yiannakis et al., "Implicit-Storing and Redundant-Encoding-of-Attribute Information in Error-Correction-Codes", 2013 46th Annual IEEE/ACM International Symposium on Microarchitecture (MICRO), 2013, pp. 160-171. 12 pages.

* cited by examiner

MEMORY MANAGEMENT WITH IMPLICIT IDENTIFICATION OF CRYPTOGRAPHIC KEYS USING ERROR CORRECTION DATA

RELATED APPLICATIONS

This is a national stage application under 35 U.S.C. 371 of International Application PCT/US23/24375, filed Jun. 2, 2023, which claims benefit to U.S. Provisional Patent Application No. 63/470,295, filed Jun. 1, 2023, which claims benefit to U.S. Provisional Patent Application No. 63/348,841, filed Jun. 3, 2022 the contents of both are incorporated by reference in their entirety herein.

TECHNICAL FIELD

The instant disclosure pertains to storage and retrieval of cryptographically encrypted data in computing systems and applications deploying multiple cryptographic keys and, more specifically, to management of memory pages shared among multiple hosts, to allocation of private copies of shared pages to individual hosts, and to using allocated pages for storing and retrieval of data.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
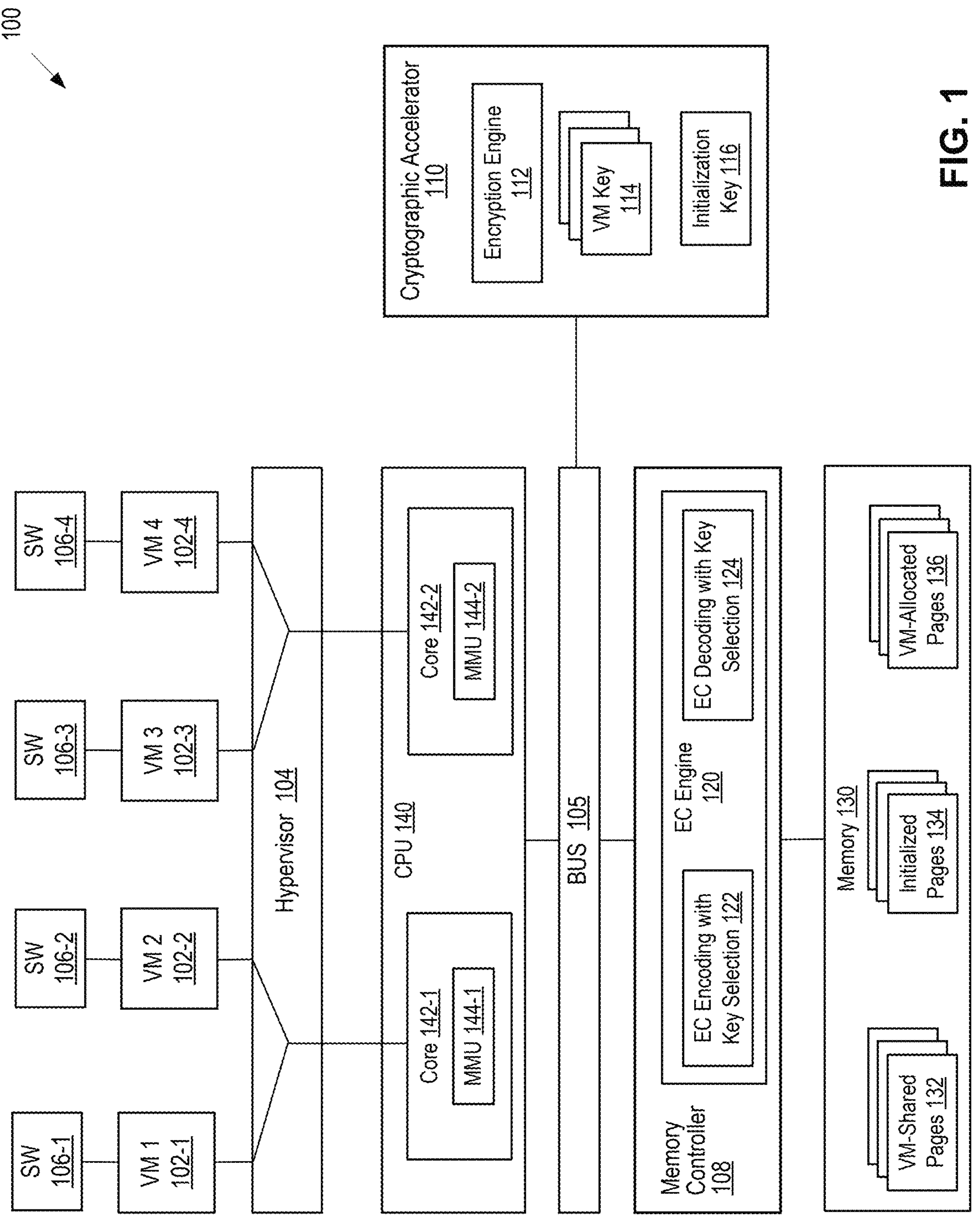
FIG. 1 is a block diagram illustrating an example system architecture in which implementations of the present disclosure may operate.

Aspects of the present disclosure are directed to efficient management of memory resources protected by multiple cryptographic keys. In various computing architectures, such as virtual machine (VM) environments, memory pages allocated to multiple VMs may initially store the same data. Consequently, instead of allocating separate physical memory pages to different VMs, a single shared physical memory page may be initialized (e.g., populated with zeros or any other initialization data) and made available to the VMs, each VM addressing the shared physical memory page using a VM-specific logical address. A Memory Management Unit (MMU) may map these logical addresses to the same shared physical memory page. Requests to read data from the shared memory page return the same data to the VMs. A request to write data by an individual VM causes the MMU to intercept the write request, copy the contents of the shared memory page to a new page, and perform the write operation by modifying the contents of the new page ("Copy-on-Write"). The new private page is then permanently associated with the individual VM (e.g., for the duration of the VM's session). This alleviates the need for the computing system (e.g., a hypervisor) to allocate many duplicate physical memory pages but allows the MMU to flexibly respond to increases in memory usage in the system.

In an Allocation-on-Write variation of the Copy-on-Write technique, a pool of initialized pages ("zero pages") is created (e.g., at the start of a VM session) and the subsequent write requests cause the MMU to select an already initialized page from the pool and write the data to the selected page. This reduced the time needed for initialization of a new page from several microseconds (for the standard Copy-on-Write technique) to several hundreds of nanoseconds.

In modern trusted VM architectures, memory space of individual VMs is often encrypted with a unique cryptographic key (e.g., a temporary ephemeral AES (Advanced Encryption Standard) key) associated with a specific VM and not accessible to other VMs. Without a correct key, data stored in a memory space of one VM would appear scrambled to another VM, e.g., a page of all zeros would appear as a page filled with non-zero data. This precludes pre-initializing a pool of zero pages available to multiple VMs since upon allocation of a page to a certain VM the new data stored in the allocated page has to be encrypted with that VM's unique key. Maintaining separate pools for different VMs (e.g., thousands of VMs) is inefficient as it may be difficult or impossible to predict accurately, at the time of initialization, how much memory each VM will use. A possible solution that allows the MMU to maintain a single pool of memory pages may include storing a key selector with each unit of data (e.g., a cache line, block, etc.) to indicate whether a key to be used in decrypting that unit is an initialization key or a VM key. For example, units of the memory page still storing initialization data may be encrypted with the initialization key while units already modified by the VM may be encrypted with a key of that VM. Even though such key selectors may be 1-bit selectors (e.g., bit value 0 indicating that the unit of data is encrypted with the initialization key and bit value 1 indicating that the unit of data is encrypted with the VM key), storing such key selectors directly in memory, however, consumes valuable space and is detrimental to system's performance and cost.

Aspects and implementations of the present disclosure address these and other shortcomings of the existing technology by describing systems and techniques for enabling selective encryption of data using multiple keys and storage of the encrypted data in a single memory page, without explicitly storing key selectors with the data. In one example implementation, tracking of key selectors (e.g., taking values 0 or 1, in the instance of two keys) may be performed by implicitly storing key selectors using error correction (EC) data. More specifically, an EC code used by a memory controller may generate and store k EC bits (also referred to as parity bits herein) for each n bits of data and store the resulting n+k bit codeword in system memory. After a read operation, the EC bits (also referred to as EC data herein) may be used to identify locations of bit errors that have occurred during write operations, storage of the data, and/or read operations. For example, a Reed-Solomon (RS) code may be capable of correcting up to k/2 errors located anywhere among the n+k bits of the codeword (or up to k errors located in known positions). Implicit storing of the key selector during a write operation may include expanding (e.g., concatenating) n bits of data encrypted with an appropriate key (e.g., initialization key or VM key) with one key selector bit identifying the correct key (or N key selector bits, if selection is to be performed from $2^N$ keys), $\text{data}_n \rightarrow \text{data}_n|\text{KeyID}_N$, and a subsequent application of the EC code to the expanded data to compute k EC bits: $\text{EC}(\text{data}_n|\text{KeyID}_N) \rightarrow \text{ECbits}_k$. A codeword is then formed by combining the n-bit data with k EC bits while omitting the key selector: $\text{CW}=\text{data}_n|\text{ECbits}_k$. The codeword CW is stored in system memory. During a read operation, the retrieved codeword is transformed into two expanded codewords (or $2^N$ expanded codewords, if selection is to be performed from $2^N$ keys), $\text{CW} \rightarrow \widetilde{CW}_0, \widetilde{CW}_1$, where $$\widetilde{CW}_0 = \text{data}_n|KeyID_{init}|ECbits_k,\quad \widetilde{CW}_1 = \text{data}_n|KeyID_{VM}|ECbits_k,$$

and two (or $2^N$) instances of an EC decoder may be applied (e.g., in parallel or sequentially) to $\widetilde{CW}_0$ and $\widetilde{CW}_1$ separately. The correct key selector may be determined based on the output of the EC decoding operations. For example, if $\text{data}_n$ and $\text{ECbits}_k$ have m combined errors such that $m<t$, where t is the maximum number of correctable errors (e.g., $t=k/2$ for RS codes), application of the EC decoder to the expanded codeword having a correct key selector will detect m errors and application of EC decoder to the expanded codeword having a wrong key selector will detect m+1 errors with the extra error pointing to the incorrect key selector. Both instances of the EC decoder will, therefore, identify both the data and the correct key selector. If $\text{data}_n$ and $\text{ECbits}_k$ have $m=t$ combined errors, application of the EC decoder to the expanded codeword having the correct key selector will recover the data and application of the EC decoder to the expanded codeword having the wrong key selector will detect an unrecoverable failure. The instance of the successful EC decoder will, therefore, identify the correct key selector. If $\text{data}_n$ and $\text{ECbits}_k$ have $m>t$ combined errors, application of EC decoders to both codewords may return an unrecoverable failure (although may sometimes, e.g., probabilistically, still recover the correct data and key selector).

Various implementations and modifications of these and other EC encryption techniques that enable storage of data encrypted with multiple keys in a single memory page are described below. The advantages of the disclosed implementations include but are not limited to efficient management of memory resources in trusted computing environments.

FIG. 1 is a block diagram illustrating an example system 100 in which implementations of the present disclosure may operate. The example system 100 may support VMs 102-1, 102-2, 102-3, 102-4 etc. The number of VMs 102-*j* need not be limited. VMs 102-*j* may be supported by a one or more hypervisors (VM monitors) 104. VMs 102-*j* may be provided to users (including local users and/or remote users) who may operate the respective VMs as if VMs were local to the users. In some implementations, VMs 102-*j* may be accessed via any computing device, such as a desktop computer, a tablet, a smartphone, a server (local or remote), a thin/lean client, and the like. VMs 102-*j* may support various software stacks (SW) 106-1, 106-2, 106-3, 106-4, etc., which may include guest operating systems, and one or more applications. Applications supported by VMs 102-*j* may include machine-learning applications, graphics applications, computational applications, cryptographic applications (such as authentication, encryption, decryption, secure storage applications, etc.), embedded applications, external applications, or any other types of applications. Applications and other software programs operating on VMs 102-1 may be executed on a multi-core processing device, e.g., CPU 140. CPU 140 may have multiple cores 142-1, 142-2, etc. Each core 142-*k* may execute instructions of one or more VMs 102-*j* and may include a corresponding memory management unit 144-1, 144-2, etc.

VMs 102-*j* and SW 106-*j* running thereon may be protected with cryptographic keys. VMs 106-*j* may store (write) data in memory 130 and retrieve (read) data from memory 130. Store and retrieve memory operations may be facilitated by memory controller 108. In some implementations, memory operations may be further facilitated by a cryptographic accelerator 110. Cryptographic accelerator 110 may include an encryption engine 112 that generates, assigns, and manages encryptions keys of VMs 102-*j* (and hypervisor 104). More specifically, encryption engine 112 may maintain VM keys 114 that protect data generated by individual VMs 102-*j* and an initialization key 116 that protects data shared among multiple VMs 102-*j*. Although multiple initialization keys 116 may be generated and used by cryptographic engine 110, the instant disclosure, for simplicity and conciseness, often refers to a single initialization key 116. Similarly, although multiple VM keys 114 may be generated per single VM, the instant disclosure, for simplicity and conciseness, may refer to a single VM key 114 per VM 102-*j*.

In some implementations, cryptographic accelerator 110 may communicate with CPU 140 and memory controller 108 via any suitable bus 105, which may use Compute Express Link™ (CXL) interconnect protocol and/or other interconnect protocols for secure storage of data and data transfers. In some implementations, cryptographic accelerator 110 may be realized in a hardware device having one or more circuits for performing processing operations and a secure memory cache for storing cryptographic keys, intermediate results, final outputs, e.g., as disclosed below in conjunction with FIGS. 2-3.

Memory controller 108 may further include an EC engine 120 for performing error correction processing. For write (store) memory operations, EC engine 120 may include an EC encoding stage 122 (with implicit key selector encoding) that generates EC bits for both the data being stored and the key selector of the cryptographic key that was used by encryption engine 112 to encrypt the data. For read memory operations, EC engine 120 may include an EC decoding stage 124 (with key selector selection) that generates multiple expanded codewords with various hypothesized key selectors, performs EC decoding for each expanded codeword, and selects the correct key selector hypothesis based on the results of the EC decoding.

Memory 130 may store VM-shared pages 132 that are encrypted with initialization key 116 and that are accessible to multiple VMs 102-*j*. Memory controller 108 may perform read operations of data stored in VM-shared pages 132 after determining that the implicitly stored key selector is that of initialization key 116 and decrypting the data using initialization key 116. Memory 130 may further store a pool of initialized pages 134 that are encrypted with initialization key 116. Once an attempt from a specific VM is made to write data to one of the VM-shared pages 132, one of initialized pages 134 is selected from the pool and allocated to that VM as a VM-allocated page 136. The new data (encrypted with VM key 114) may coexist in the VM-allocated page 136 with previously stored data (encrypted with initialization key 116). When the VM reads a unit of data stored in one of the VM-allocated pages 136, cryptographic accelerator 110 determines an implicitly stored key selector and decrypts the data. For example, if the implicitly stored key selector is that of initialization key 116 (for the data that has not been modified by the VM), encryption engine 112 applies initialization key 116 to decrypt a unit of data. Conversely, if the implicitly stored key selector is that of VM key 114 (for the data modified by the VM), encryption engine 112 applies VM key 114 to decrypt the unit of data. In both instances, cryptographic accelerator 110 provides the decrypted unit of data to the VM.

System memory 130 may be (or include) a random-access memory (RAM), electrically erasable programmable read-only memory (EEPROM), flip-flop memory, dynamic random-access memory (DRAM), synchronous DRAM (SDRAM), a static memory, such as static random-access memory (SRAM), and/or the like.

Example system 100 may further include one or more processors, e.g., CPUs 140, GPUs, field-programmable gate arrays (FPGA), application-specific integration circuits (ASICs), and so on. "Processor" refers to a device capable of executing instructions encoding arithmetic, logical, or I/O operations. In one illustrative example, a processor may follow Von Neumann architectural model and may include one or more arithmetic logic units (ALUs), a control unit, and may include a cache. In some implementations, some or all of the functions of cryptographic accelerator 110 may be performed by processor 140. In some implementations, processor 140 and system memory 130 may be implemented as a single controller, e.g., as an FPGA. Processor 140 may be implemented as a single integrated circuit, two or more integrated circuits, or may be a component of a multi-chip module. Processor 140 may include one or more processor cores. In some implementations, each processor core may execute instructions to run multiple hardware threads, also known as logical processors. One or more logical processors may be assigned to various VMs 102-*j*. In some implementations, more than one logical processor may be assigned to a given VM. In some implementations, a single logical processor may be assigned to a group of multiple VMs.

Example system 100 may further include a network interface (not shown in FIG. 1) to facilitate connection of users' computers that access various VMs 102-*j* to example system 100 via one of a variety of networks, e.g., Internet, wireless local area networks (WLAN), personal area networks (PAN), public networks, private networks, and/or the like or any combination thereof.

Figure 2B:
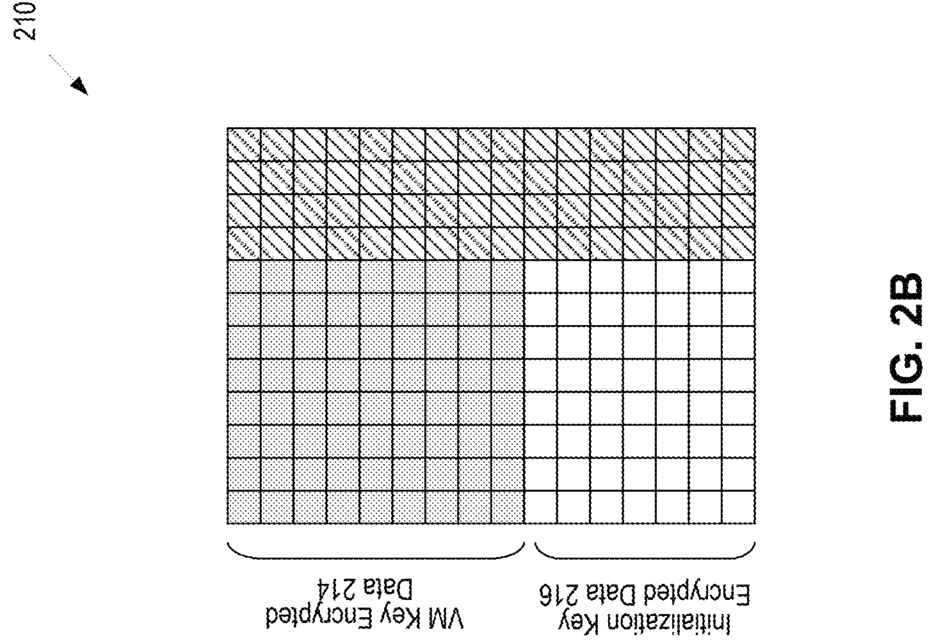
FIG. 2B illustrates schematically a memory page that stores data encrypted with different keys, in accordance with some implementations of the present disclosure.
Figure 2A:
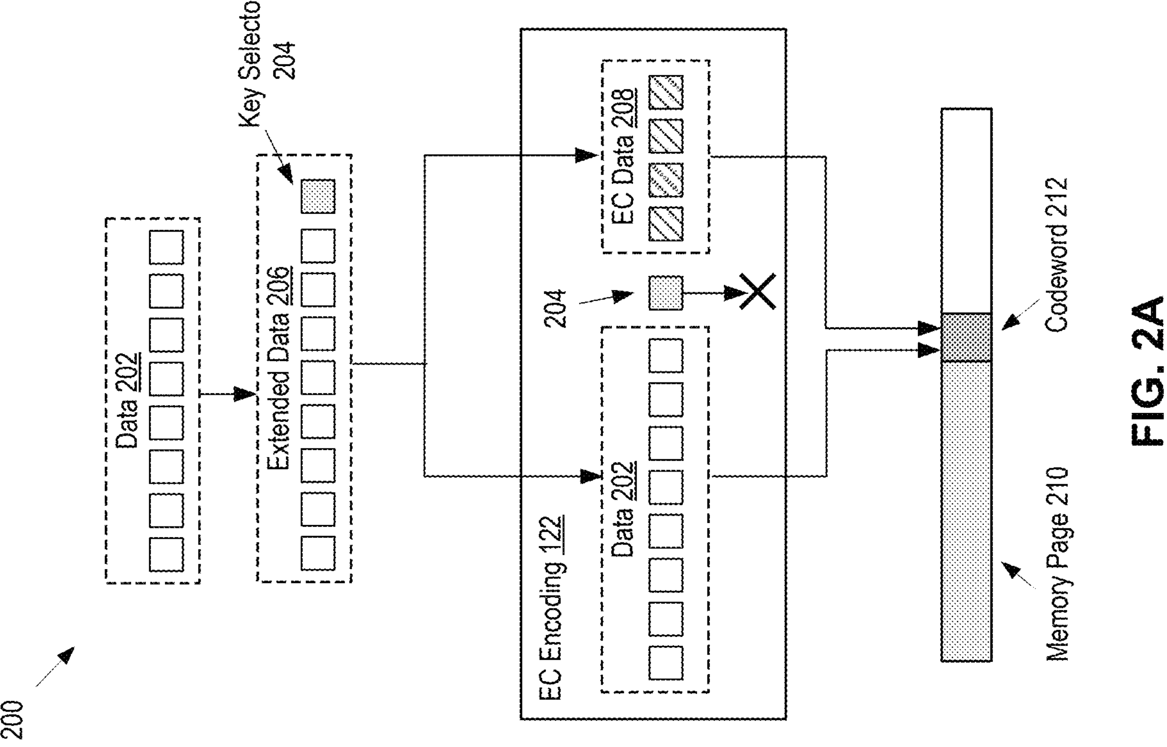
FIG. 2A is a schematic diagram illustrating example operations of error correction encoding with implicit storage of key identification using error correction data, in accordance with some implementations of the present disclosure.

FIG. 2A is a schematic diagram illustrating example operations 200 of EC encoding with implicit storage of key selectors using EC data, in accordance with some implementations of the present disclosure. Example operations 200 allow storing data encrypted with different keys in a single memory page, without the need to explicitly store identification of the cryptographic keys that encrypt various portions (units) of the memory page. As illustrated, a VM may attempt to write data 202 to a memory page 210. Data 202 may have any suitable size, e.g., 512 bytes, 64 bytes, 32 bytes, and/or the like. Data 202 may be encrypted with a VM key for the VM (encryption operations are not explicitly shown in FIG. 2A). Key selector 204 (e.g., 0 or 1) of the VM key encrypting data 202 may be appended to data 202 to obtain an extended data 206. Extended data 206 may be processed by EC encoding stage 122 that applies any suitable EC code, e.g., Reed-Solomon code, Bose-Chaudhuri-Hocquenghem code, Goppa code, Hamming code, SECDED code, and/or the like. EC encoding stage 122 may generate EC data 208 for extended data 206. Data 202 and EC data 208 may then be combined (e.g., concatenated) and stored as codeword 212 in memory page 210. Key selector 204 is not stored explicitly. Instead, key selector 204 is stored implicitly, encoded in EC data 208 computed in view of key selector 204.

FIG. 2B illustrates schematically memory page 210 that stores data encrypted with different keys, in accordance with some implementations of the present disclosure. As illustrated, memory page 210 may include units of data 214 (depicted with shaded squares) encrypted with a VM key and units of data 216 still encrypted with initialization key (and depicted with white squares). Each unit of data is accompanied with EC data (depicted with cross-hatched squares). Although FIG. 2B illustrates memory page 210 with 16 units (lines) of stored data, a memory page may store any other number of units of data (e.g., hundreds, thousands, or more units).

Figure 2C:
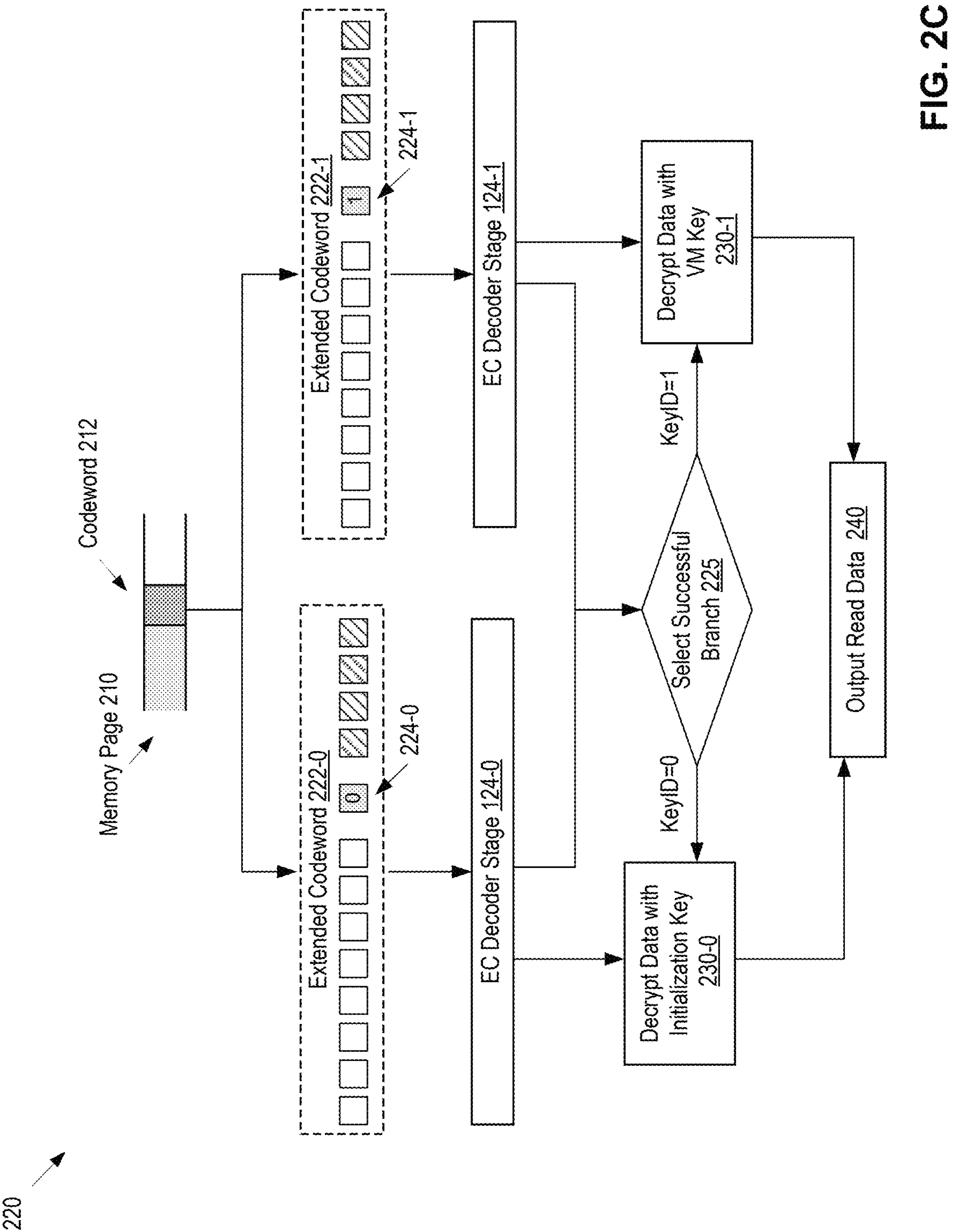
FIG. 2C is a schematic diagram illustrating example operations of error correction decoding with recovery of an implicitly stored key selectors, in accordance with some implementations of the present disclosure.

FIG. 2C is a schematic diagram illustrating example operations 220 of EC decoding with recovery of an implicitly stored key selectors, in accordance with some implementations of the present disclosure. Example operations 220 may be performed to read data previously stored using example operations 200 of FIG. 2A. In particular, example operations 220 allow reading units of data that are encrypted with different keys and stored in the same memory page, without explicitly stored identification of the cryptographic keys encrypting various units of data. As illustrated, a read operation may be directed to retrieve data stored as part of codeword 212 in memory page 210. Codeword 212 may be transformed into multiple extended codewords 220-0, 220-1, and so on (if N>2 keys need to be identified). Each extended codeword 222-*j* includes one or two (or N) possible key selectors 224-*j* in a known position. FIG. 2A and FIG. 2C illustrate the key selector position that follows all bits of the data (a grey square positioned after white squares), but any other placement of key selectors is also possible, as long as the placement is consistent between EC encoding operations and EC decoding operations. For example, key selector 224-0 having value 0 may correspond to an initialization key 116 and key selector 224-1 having value 1 may correspond to VM key 114 (or vice versa).

Each extended codeword 222-*j* may be processed by a respected stage of the EC decoder, e.g., extended codeword 222-0 may be processed by EC decoding stage 124-0 and extended codeword 222-1 may be processed by EC decoding stage 124-1. Different EC decoding stages 124-*j* may be performed sequentially by the same processing circuits or in parallel by separate processing circuits. At decision-making block 225, example operations 220 may include selecting a successful branch of EC decoding. For example, since an incorrect key selector in an extended codeword amounts to an additional error, the successful branch of EC decoding may have fewer errors than the other branch (or N−1 other branches, if N>1 different key selectors are being disambiguated). In some instances, e.g., if the number of errors in codeword 212 is less than the maximum number t of correctable errors of the specific EC code being used, both data and key selector recovered by each of EC decoding stages 124-*j* may be consistent with each other (e.g., may be the same). In particular, the correct key selector corresponds to an EC decoder stage that detects and corrects fewer errors. For example, if the correct key is the initialization key, EC decoding stage 124-1 may detect and correct an error in the position of key selector 224-1 while EC decoding stage 124-0 may detect absence of an error in the position of key selector 224-0. In those instances where the number of errors in codeword 212 is equal to the maximum number t of correctable errors, an EC decoding stage processing the extended codeword with the correct key selector may succeed to correct errors, while other EC decoding stages (processing extended codewords with t+1 errors) may detect an unrecoverable error. (In many instances, even an EC decoding stage processing t+1 errors may still correct all errors, using various techniques of error correction beyond the Singleton bound, but this may not be guaranteed in all cases.)

In some implementations, identifying the correct key selector may be based on computing syndrome values for various extended codewords 222-*j*. For example, in Reed-Solomon codes, codewords may be treated as polynomials CW(x) that may be evaluated at a set of roots $x=a_1, a_2 \ldots a_k$ (selected as part of EC encoding) and resulting in k syndrome values $S_j=CW(a_j)$. Zero syndrome values, $\{S_j\}=0$, indicate that the retrieved codeword has no error. Some of the syndrome values $S_j$ being non-zero indicate that one or more symbols of the codeword have been corrupted (or that the implicitly stored key selector has been hypothesized incorrectly). Syndrome values $S_j$ may be used as coefficients in a key equation for an error locator polynomial whose solutions identify locations of errors and facilitate identification and correction of the values of those errors.

Based on the identified key selector, example operations 220 may continue with decrypting the data (which has been corrected of errors, if present) using the identified key selector. For example, if identified KeyID=0, decryption may proceed with the initialization key (block 230-0) whereas identified KeyID=1 may cause the decryption to be performed using the VM key (block 230-1). The decrypted data is then returned to the requesting VM (block 240) or an application running on the requesting VM, as applicable.

Figure 3:
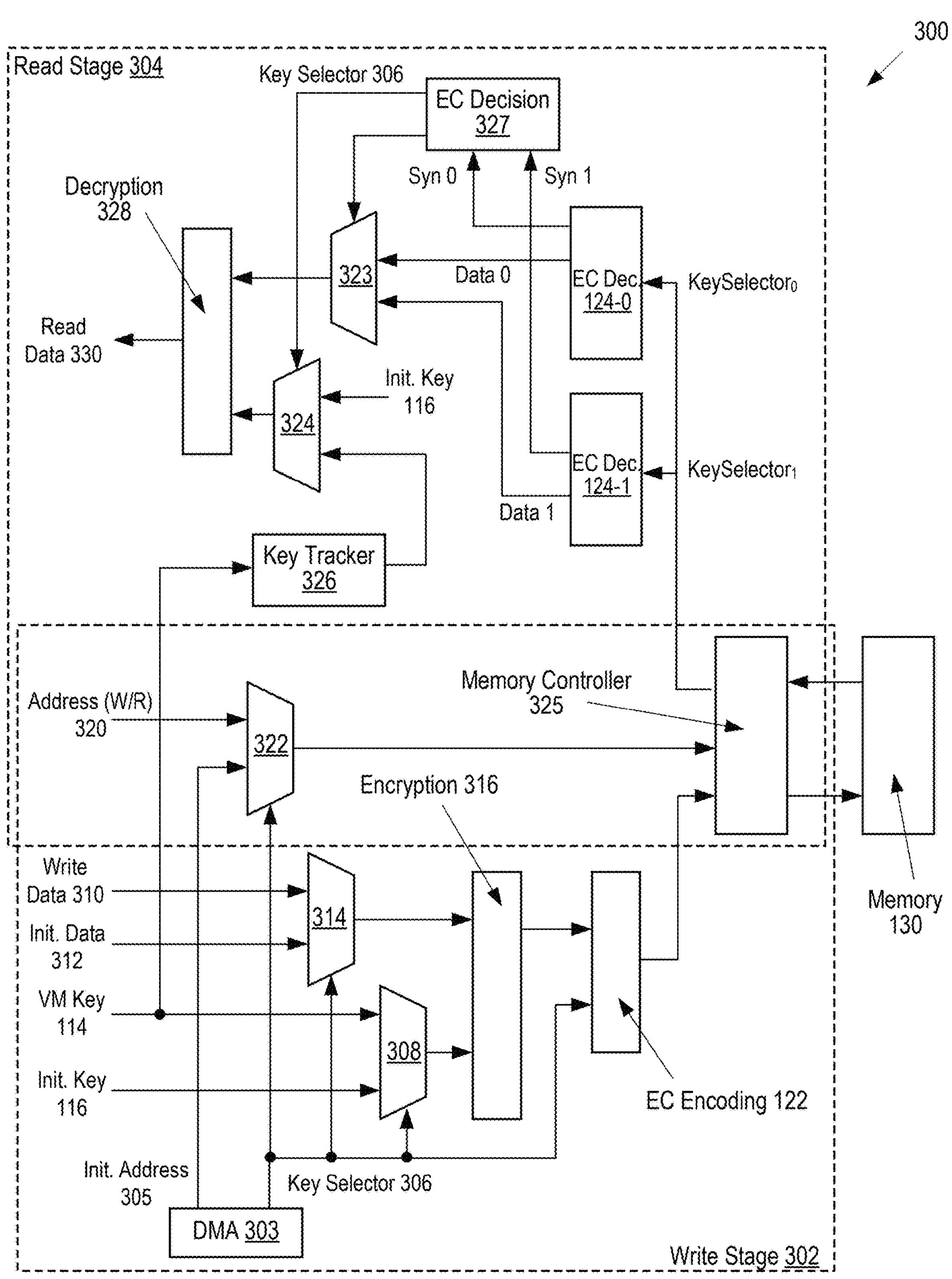
FIG. 3 illustrates an example architecture of a cryptographic accelerator capable of supporting write and read memory operations using implicitly stored identification of cryptographic keys, in accordance with some implementations of the present disclosure.

FIG. 3 illustrates an example architecture of a cryptographic accelerator 300 capable of supporting write and read memory operations using implicitly stored identification of cryptographic keys, in accordance with some implementations of the present disclosure. Cryptographic accelerator 300 combines a write stage 302 that performs storage of data in memory 130 with a read stage 304 that performs retrieval of storage data from memory 130. Write stage 302 may be capable of performing a write operation requested by a VM (or any other host) as well as initialization of new memory pages (e.g., as may be requested by hypervisor 104 of FIG. 1) to be placed in the pool of initialized memory pages. A Direct Memory Access (DMA) engine 303 may generate memory write operations that involve page initialization. DMA engine 303 may control the type of the memory operation, e.g., by outputting a key selector 306 associated with the operation (or by outputting some other control signal associated with key selector 306). For example, key selector 306 identifying the initialization key may indicate that a page initialization operation is to be performed while key selector 306 identifying a VM key may indicate that a write operation requested by that VM is to be performed.

Key selector 306 may serve as a control signal for multiplexers 308, 314, and 322. Multiplexer 308 may select a correct key, e.g., from VM key 114 and initialization key 116. Multiplexer 314 may select a target data, e.g., from write data 310 and initialization data 312. (Initialization key 116 and initialization data 312 may be constant values.) In some implementations, initialization data 312 may be zero data (having all zero-bit values). In some implementations, initialization data 312 may be any other predefined data. Multiplexer 322 selects between an address 320 of the write operation or an initialization address 305 for the page being initialized. Encryption stage 316 may encrypt data (e.g., write data 310 or initialization data 312, depending on the control signal key selector 306) using the correct key (e.g., VM key 114 or initialization key 116, depending on key selector 306 provided as the control signal). Encryption stage 316 (which may be a part of encryption engine 112 of FIG. 1) may include an AES block cipher (with a block size of 128 bits, 192 bits, 256 bits), e.g., a 256-bit AES-XTS cipher. In some implementations, encryption stage 316 may include a DES block cipher, IDEA block cipher, Serpent block cipher, Twofish block cipher, and/or other block ciphers. In some implementations, encryption stage 316 may include stream cipher, e.g., Salsa20 stream cipher, Rivest Cipher (RC4), ChaCha stream cipher, and/or other stream ciphers. Encryption stage 316 is followed with EC encoding stage 122 that implicitly stores key selector 306 in EC bits, as disclosed above, e.g., in conjunction with FIG. 2A. A memory controller 325 then stores the encrypted data and EC bits in a memory address of memory 130, as output by multiplexer 322.

Operations of read stage 304 may include receiving an address 320 of a read request and using memory controller 325 to fetch data (codeword) stored at address 320 of memory 130. The fetched codeword is provided to multiple EC decoding stages, e.g., EC decoding stage 124-0 and EC decoding stage 124-1. Each EC decoding stage may extend the fetched codeword with a different prospectively assumed value key selector 306 and perform EC decoding of the respective extended codeword, e.g., as disclosed above in conjunction with FIG. 2C. In some implementations, the decoded data outputted by EC decoding stages 124-0 and 124-1 (e.g., Data 0 and Data 1, respectively) may be provided to multiplexer 323. Syndrome values computed by EC decoding stages 124-0 and 124-1 (e.g., Syn 0 and Syn 1, respectively) may be provided to EC decision stage 327 that determines, based on syndrome values, the correct value of key selector 306. The determined key selector 306 is used as the control signal provided to multiplexer 323 that selects from Data 0 or Data 1. The control signal with key selector 306 may also be provided to multiplexer 324 that selects the correct key for the selected data, e.g., from initialization key 116 and VM key 114, which may be stored in key tracker 326. In some implementations, key tracker 326 may store VM key 114. For example, when a sequence of read operations is being performed by memory controller 325, memory controller 325 may execute the operations out-of-order. Correspondingly, key tracker 326 may hold various VM keys 114 associated with read operations pending in memory controller 325 until the respective read operations are completed. Using a correct key provided by multiplexer 324, a decryption stage 328 decrypts data provided by multiplexer 323, decryption stage 328 decrypts and outputs read data 330.

Multiple variations of the disclosed systems and techniques may also be implemented. The number of EC decoding stages 124-*j* may be anywhere between one (where all N possible values of key selector 306 are processed in series) and N (where all possible values of key selector 306 are processed in parallel). For example, if N=4 keys are to be disambiguated, cryptographic accelerator 300 may use two epochs, each epoch processing a pair of possible values of key selector 306 in parallel. Similarly, a cryptographic accelerator with M EC decoding stages may use N/M time epochs, each epoch processing M possible values of key selector 306 in parallel. In some implementations, e.g., in Reed-Solomon EC coded that use 8-bit symbols representing elements of the Galois field $GF(2^8)$, a single symbol may implicitly encode, using techniques disclosed herein, up to $2^8$ different key selectors associated with $2^8$ different keys, or, more generally, $2^p$ different keys per one element of $GF(2^p)$. Among $2^p$ different keys may be multiple initializations keys used to encrypt separate pools of initialized pages.

In some instances, less than a full unit of data in a zero-page may have to be stored or updated. In such instances, the partial store/update operation may be performed as a combination of a read operation and a write operation. More specifically, a read operation may be performed on the full unit of data using the initialization key. A target portion of the unit of data may then be modified/updated and a write operation may be performed using a VM key of the VM performing the update encrypting the full unit of data.

Figure 4:
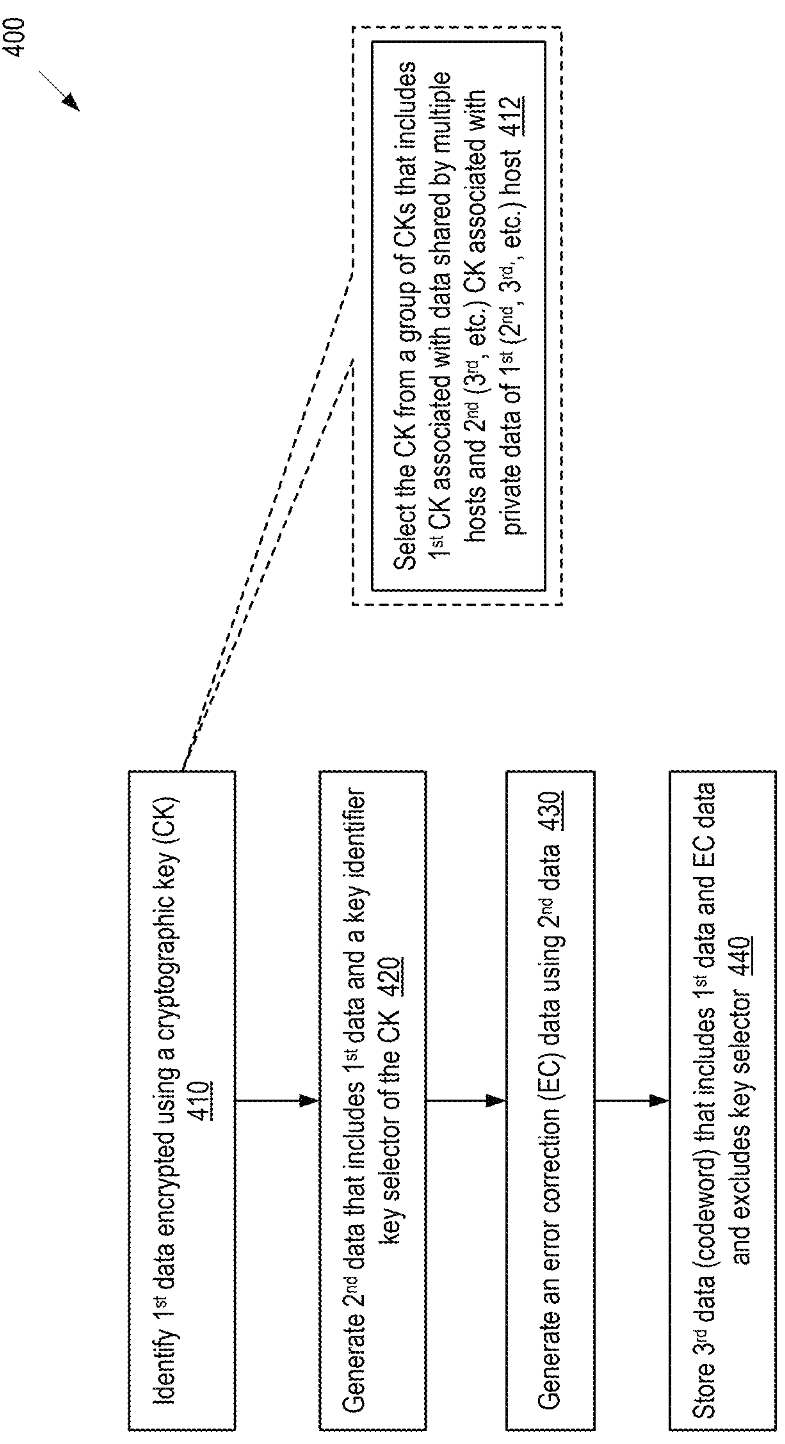
FIG. 4 is a flow diagram of an example method of performing a write operation with implicit storage of cryptographic key identification using error correction data, in accordance with some implementations of the present disclosure.
Figure 5:
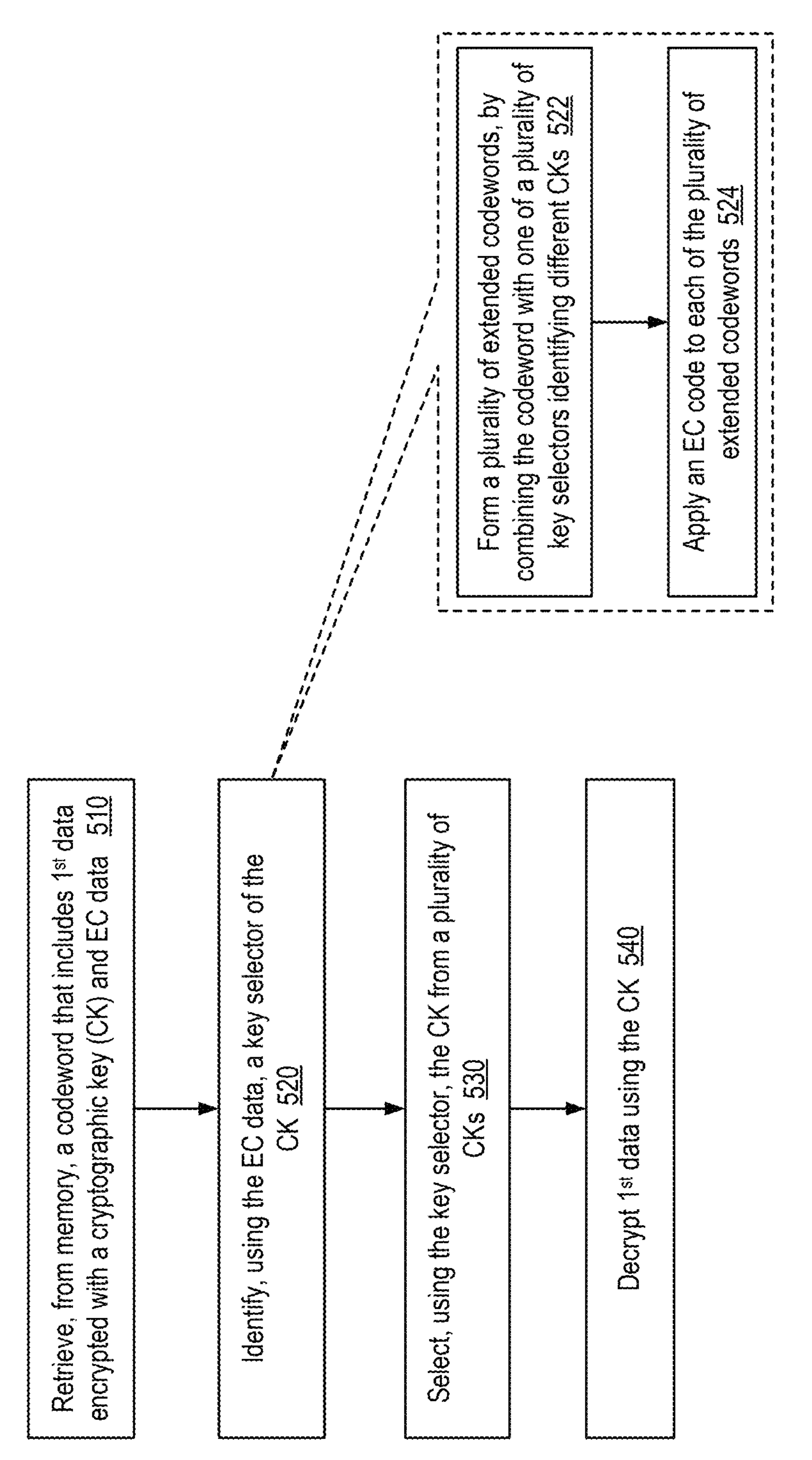
FIG. 5 is a flow diagram of an example method of performing a read operation with recovery of implicitly stored, using error correction data, cryptographic key identification, in accordance with some implementations of the present disclosure.

FIGS. 4-5 are flow diagrams depicting illustrative methods 400-500 of storing and retrieving information with implicitly stored, using EC data, identification of cryptographic keys, in accordance with one or more aspects of the present disclosure. Methods 400-500 and/or each of their individual functions, routines, subroutines, or operations may be performed by a cryptographic accelerator (cryptographic processor), such as cryptographic accelerator 110, or a general-purpose processor, such as processor 140 of FIG. 1. Various blocks of methods 400-500 may be performed in a different order compared with the order shown in FIGS. 4-5. Some operations may be performed concurrently with other operations. Some operations may be optional. Methods 400-500 may be implemented as part of provisioning of trusted VM services protected with memory encryption. In some implementations, at least some operations of methods 400-500 may be performed in parallel, each parallel thread executing one or more individual functions, routines, subroutines, or operations of the methods. In some implementations, parallel threads implementing methods 400-500 may be synchronized (e.g., using semaphores, critical sections, and/or other thread synchronization mechanisms). Alternatively, threads implementing each of methods 400-500 may be executed asynchronously with respect to each other. Various operations of methods 400-500 may be performed in a different order compared with the order shown in FIGS. 4-5. Some operations of methods 400-500 may be performed concurrently with other operations. In some implementations of methods 400-500, one or more operations shown in FIGS. 4-5 are not always performed.

FIG. 4 is a flow diagram of an example method 400 of performing a write operation with implicit storage of cryptographic key identification using error correction data, in accordance with some implementations of the present disclosure. In some implementations, the write operation of method 400 may be performed by one or more processing circuits of write stage 302 of cryptographic accelerator 300 or some other suitable processing device (including but not limited to processor 140 of FIG. 1). At block 410, the one or more processing circuits may identify a first data (e.g., data 202 in FIG. 2A) having a first size. The first data may be encrypted using a cryptographic key (e.g., using encryption stage 316 of FIG. 3). In some implementations, the cryptographic key may be an ephemeral key. As indicated with block 412, the cryptographic key may be selected (e.g., using multiplexer 308 of FIG. 3) from a group of cryptographic keys that may include a first cryptographic key encrypting data shared by a plurality of hosts (e.g., an initialization key 116) and a second (third, etc.) cryptographic key encrypting private data associated with a first (second, etc.) host of the plurality of hosts. In some implementations, the first (second, etc.) host of the plurality of hosts may be or include a virtual machine, and the first cryptographic key may, correspondingly, be (or include) a VM key 114 for the respective virtual machine.

At block 420, method 400 may continue with the one or more processing circuits generating a second data (e.g., extended data 206 in FIG. 2A) that includes the first data and a key selector of the cryptographic key.

At block 430, the one or more processing circuits performing method 400 may generate an error correction (EC) data (e.g., EC data 208) using the second data (e.g., using EC encoding stage 122 of FIG. 3). The EC data may have a second size (which may or may not be different from the first size). In some implementations, to generate the EC data, the one or more processing circuits are to apply a Reed-Solomon EC code to the second data.

At block 440, method 400 may include storing a third data (e.g., codeword 212 in FIG. 2A) in a memory (e.g., memory 130). The third data may include the first data and the EC data but exclude the key selector. In some implementations, the third size does not exceed a sum of the first size and the second size. The third data may be stored in a memory partition (e.g., memory page of FIGS. 2A-2C) storing a plurality of memory units, wherein a first subset of one or more memory units of the plurality of memory units is encrypted with the cryptographic key (e.g., VM key 114 or initialization key 116) and a second subset of one or more memory units of the plurality of memory units is encrypted with a different cryptographic key (e.g., initialization key 116 or VM key 114).

FIG. 5 is a flow diagram of an example method 500 of performing a read operation with recovery of implicitly stored, using error correction data, cryptographic key identification, in accordance with some implementations of the present disclosure. In some implementations, the read operation of method 500 may be performed by one or more processing circuits of read stage 304 of cryptographic accelerator 300 or some other suitable processing device (including but not limited to processor 140 of FIG. 1). At block 510, the one or more processing circuits may retrieve a codeword (e.g., codeword 212 in FIG. 2C) from a memory (e.g., memory 130). The codeword may include a first data encrypted with a cryptographic key and an EC data.

At block 520, method 500 may continue with the one or more processing circuits identifying, using the EC data, a key selector of the cryptographic key. In some implementations, to identify the key selector, the one or more processing circuits may apply a Reed-Solomon EC code to the codeword. As illustrated with the callout portion of FIG. 5, identifying the key selector may include, at block 522, forming a plurality of extended codewords (e.g., extended codewords 222-0, 220-1, etc.). Each of the plurality of extended codewords may be formed by combining the codeword with one of a plurality of key selectors (e.g., key selectors 224-0, 224-1, etc.) identifying a respective one of the plurality of cryptographic keys. At block 524, method 500 may include applying an EC code to each of the plurality of extended codewords (e.g., via ED decoding stages 124-0, 124-1, etc., in FIG. 2A and FIG. 3). In some implementations, applying the EC code to each of the plurality of extended codewords may include computing syndrome values for each of the plurality of extended codewords and identifying the key selector of the cryptographic key using the computed syndrome values. In some implementations, applying the EC code to each of the plurality of extended codewords may include identifying a target extended codeword of the plurality of extended codewords, the target extended codeword having fewer errors than each other of the plurality of extended codewords. The correct key selector may then be identified as a key selector included in the target extended codewords. In some implementations, the one or more processing circuits are to apply the EC code to at least two of the plurality of extended codewords in parallel (e.g., as illustrated with EC decoding stages 124-1 and 124-2 in FIG. 3).

At block 530, the one or more processing circuits performing method 500 may select, using the key selector, the cryptographic key from the plurality of cryptographic keys (e.g., using multiplexers 323, 324, and EC decision stage 327 in FIG. 3) and, at block 540, may decrypt the first data using the cryptographic key (e.g., using decryption stage 328 in FIG. 3).

Figure 6:
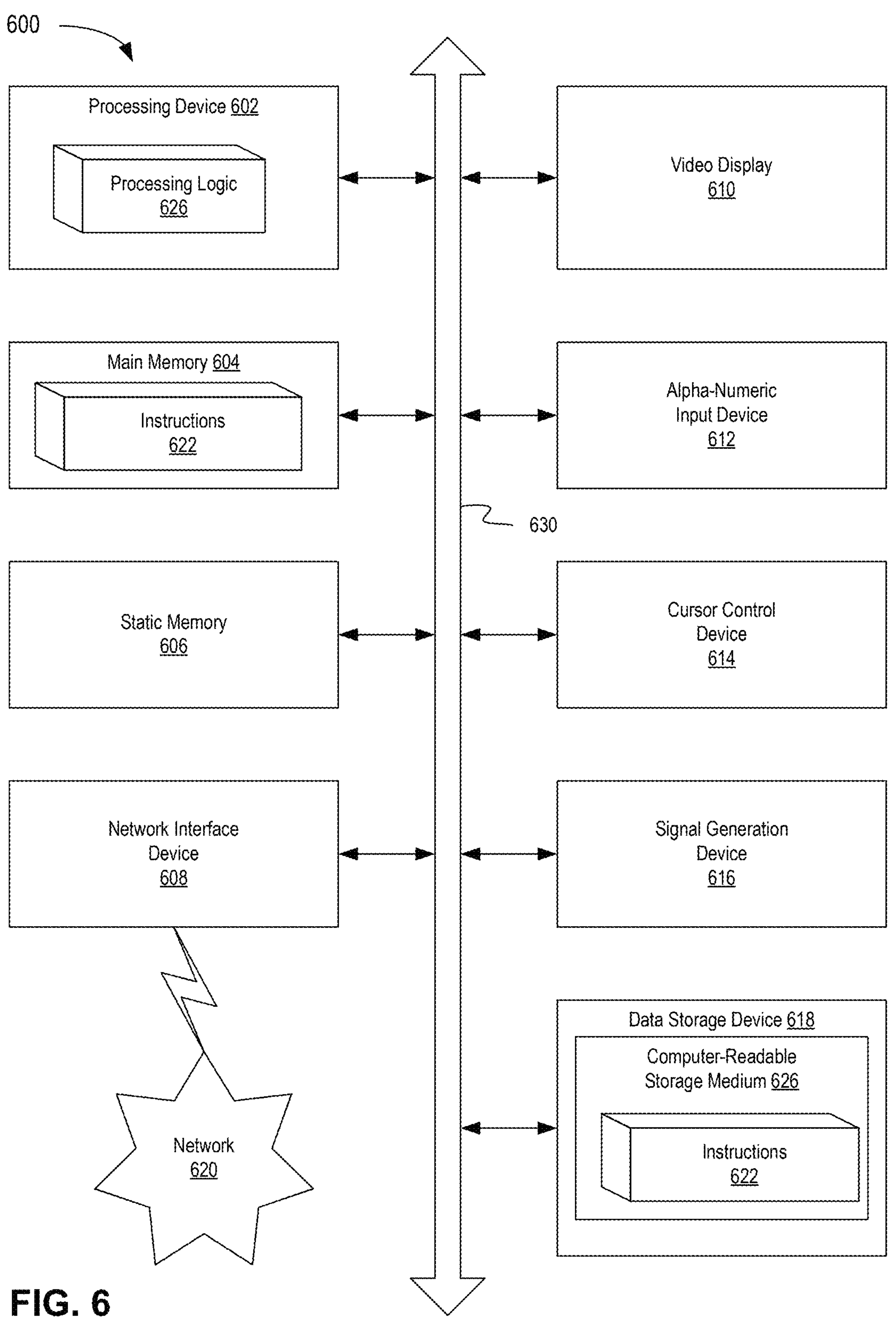
FIG. 6 depicts a block diagram of an example computer system operating in accordance with one or more aspects of the present disclosure.

FIG. 6 depicts a block diagram of an example computer system 600 operating in accordance with one or more aspects of the present disclosure. In various illustrative examples, example computer system 600 may include example system 100, illustrated in FIG. 1. Example computer system 600 may be connected to other computer systems in a LAN, an intranet, an extranet, and/or the Internet. Computer system 600 may operate in the capacity of a server in a client-server network environment. Computer system 600 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 600 may include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 may be configured to execute instructions implementing method 400 of performing a write operation with implicit storage of cryptographic key identification using error correction data, and method 500 of performing a read operation with recovery of implicitly stored, using error correction data, cryptographic key identification.

Example computer system 600 may further comprise a network interface device 608, which may be communicatively coupled to a network 620. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 may include a computer-readable storage medium (or, more specifically, a non-transitory computer-readable storage medium) 626 on which is stored one or more sets of executable instructions 622. In accordance with one or more aspects of the present disclosure, executable instructions 622 may comprise executable instructions implementing method 400 of performing a write operation with implicit storage of cryptographic key identification using error correction data, and method 500 of performing a read operation with recovery of implicitly stored, using error correction data, cryptographic key identification.

Executable instructions 622 may also reside, completely or at least partially, within main memory 604 and/or within processing device 602 during execution thereof by example computer system 600, main memory 604 and processing device 602 also constituting computer-readable storage media. Executable instructions 622 may further be transmitted or received over a network via network interface device 608.

While the computer-readable storage medium 626 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A processor to:

identify a first data having a first size, wherein the first data is encrypted using a cryptographic key;

generate a second data comprising the first data and a key selector of the cryptographic key;

generate an error correction (EC) data using the second data, the EC data having a second size; and store a third data in a memory, the third data having a third size, wherein the third data comprises the first data and the EC data, and wherein the third size does not exceed a sum of the first size and the second size.

2. The processor of claim 1, wherein the cryptographic key is selected from a group of cryptographic keys comprising:

a first cryptographic key encrypting data shared by a plurality of hosts; and a second cryptographic key encrypting private data associated with a first host of the plurality of hosts.

3. The processor of claim 2, wherein the group of keys further comprises:

a third cryptographic key encrypting private data associated with a second host of the plurality of hosts.

4. The processor of claim 2, wherein the first host of the plurality of hosts comprises a virtual machine.

5. The processor of claim 1, wherein to generate the EC data, the processor is to apply a Reed-Solomon EC code to the second data.

6. The processor of claim 1, wherein the third data is stored in a memory partition storing a plurality of memory units, wherein a first subset of one or more memory units of the plurality of memory units is encrypted with the cryptographic key and a second subset of one or more memory units of the plurality of memory units is encrypted with a different cryptographic key.

7. A system comprising:

a memory; and a processing device coupled to the memory, the processing device to:

identify a first data having a first size, wherein the first data is encrypted using a cryptographic key;

generate a second data comprising the first data and a key selector of the cryptographic key;

generate an error correction (EC) data using the second data, the EC data having a second size; and store a third data in the memory, the third data having a third size, wherein the third data comprises the first data and the EC data, and wherein the third size does not exceed a sum of the first size and the second size.

8. The system of claim 7, wherein the cryptographic key is selected from a group of cryptographic keys comprising:

a first cryptographic key encrypting data shared by a plurality of hosts; and a second cryptographic key encrypting private data associated with a first host of the plurality of hosts.

9. The system of claim 8, wherein the group of keys further comprises:

a third cryptographic key encrypting private data associated with a second host of the plurality of hosts.

10. The system of claim 8, wherein the first host of the plurality of hosts comprises a virtual machine.

11. The system of claim 7, wherein to generate the EC data, the processing device is to apply a Reed-Solomon EC code to the second data.

12. The system of claim 7, wherein the third data is stored in a memory partition storing a plurality of memory units, wherein a first subset of one or more memory units of the plurality of memory units is encrypted with the cryptographic key and a second subset of one or more memory units of the plurality of memory units is encrypted with a different cryptographic key.

13. A method comprising:

identifying, by a processing device, a first data having a first size, wherein the first data is encrypted using a cryptographic key;

generating, by the processing device, a second data comprising the first data and a key selector of the cryptographic key;

generating, by the processing device, an error correction (EC) data using the second data, the EC data having a second size; and storing, by the processing device, a third data in a memory, the third data having a third size, wherein the third data comprises the first data and the EC data, and wherein the third size does not exceed a sum of the first size and the second size.

14. The method of claim 13, wherein the cryptographic key is selected from a group of cryptographic keys comprising:

a first cryptographic key encrypting data shared by a plurality of hosts; and a second cryptographic key encrypting private data associated with a first host of the plurality of hosts.

15. The method of claim 14, wherein the group of keys further comprises:

a third cryptographic key encrypting private data associated with a second host of the plurality of hosts.

16. The method of claim 14, wherein the first host of the plurality of hosts comprises a virtual machine.

17. The method of claim 13, wherein generating the EC data comprises applying a Reed-Solomon EC code to the second data.

18. The method of claim 13, wherein the third data is stored in a memory partition storing a plurality of memory units, wherein a first subset of one or more memory units of the plurality of memory units is encrypted with the cryptographic key and a second subset of one or more memory units of the plurality of memory units is encrypted with a different cryptographic key.

* * * * *